(12) United States Patent
Suryanarayana et al.

(10) Patent No.: US 7,657,269 B2
(45) Date of Patent: Feb. 2, 2010

(54) METHOD AND APPARATUS FOR LOCATING MULTIMODE COMMUNICATION DEVICES

(75) Inventors: Lalitha Suryanarayana, Austin, TX (US); Anil Doradla, Austin, TX (US); Michael Grannan, Austin, TX (US); Arunabha Ghosh, Austin, TX (US); Rias Muhamed, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 524 days.

(21) Appl. No.: 11/220,256

(22) Filed: Sep. 6, 2005

(65) Prior Publication Data

US 2007/0054673 A1    Mar. 8, 2007

(51) Int. Cl.
H04W 24/00 (2006.01)
H04W 11/04 (2006.01)
H04M 3/42 (2006.01)

(52) U.S. Cl. ............ 455/456.5; 455/456.1; 455/404.2; 455/414.2; 455/456.2

(58) Field of Classification Search .............. 455/404.1, 455/404.2, 456.1, 456.2, 456.5, 457, 552.1, 455/553.1, 41.2
See application file for complete search history.

(56) References Cited

U.S. PATENT DOCUMENTS

| | | | |
|---|---|---|---|
| 5,999,124 A | 12/1999 | Sheynblat | |
| 7,254,405 B2 * | 8/2007 | Lin et al. | 455/456.1 |
| 2004/0258012 A1 | 12/2004 | Ashii | |
| 2005/0070306 A1 * | 3/2005 | Kim et al. | 455/456.2 |
| 2005/0186967 A1 | 8/2005 | Ozluturk | |
| 2005/0255865 A1 * | 11/2005 | Sillasto et al. | 455/456.5 |
| 2006/0217127 A1 * | 9/2006 | Drane et al. | 455/456.1 |
| 2007/0026870 A1 * | 2/2007 | Spain et al. | 455/456.1 |

FOREIGN PATENT DOCUMENTS

FR    2852181    9/2004

* cited by examiner

*Primary Examiner*—George Eng
*Assistant Examiner*—Un C Cho
(74) *Attorney, Agent, or Firm*—Ed Guntin; Pablo Meles; Akerman Senterfitt

(57) ABSTRACT

A location services controller (104) for locating multimode communication devices (MCDs) (102) has a communication element (302) for communicating with two or more communication networks (106) and MCDs coupled thereto, a memory (304), and a processor (306) for controlling operations thereof. The processor is programmed to request (402) location information of an MCD from at least two sources selected among a group that can include the MCD and one or more communication networks coupled to the MCD, and determine (426) from the sources of location information the location of the MCD.

18 Claims, 5 Drawing Sheets

METHOD AND APPARATUS FOR LOCATING MULTIMODE COMMUNICATION DEVICES

FIELD OF THE DISCLOSURE

The present disclosure relates generally to location services, and more specifically to a method and apparatus for locating multimode communication devices.

BACKGROUND

Location services have been used as a means to comply with FCC requirements for emergency 911 services (better known as E911), and for commercial purposes such as navigation, and marketing in a push-pull advertising environment. Several automation techniques have been used for locating a mobile device such as, for example, TDOA (Time Difference Of Arrival), Enhanced Observed Time Difference (E-OTD), Angle of Arrival, Cell of Origin, and assisted GPS.

The issue with these techniques is that in-building interference or other obstructions substantially reduce the accuracy of locating the mobile device. Accuracy becomes especially important under emergency conditions. TDOA systems typically provide a location estimate that barely meets the FCC E911 mandate of 50 meters with a 67% confidence level, and 150 meters with a 95% confidence level. GPS (Global Positioning Systems) also fail to meet these requirements when the mobile device is inside a building, thereby interfering with the mobile device's line-of-site access to GPS satellite constellations roaming Earth's orbit.

A need therefore arises for a method and apparatus for improving location services.

DETAILED DESCRIPTION OF THE DRAWINGS

Figure 1:
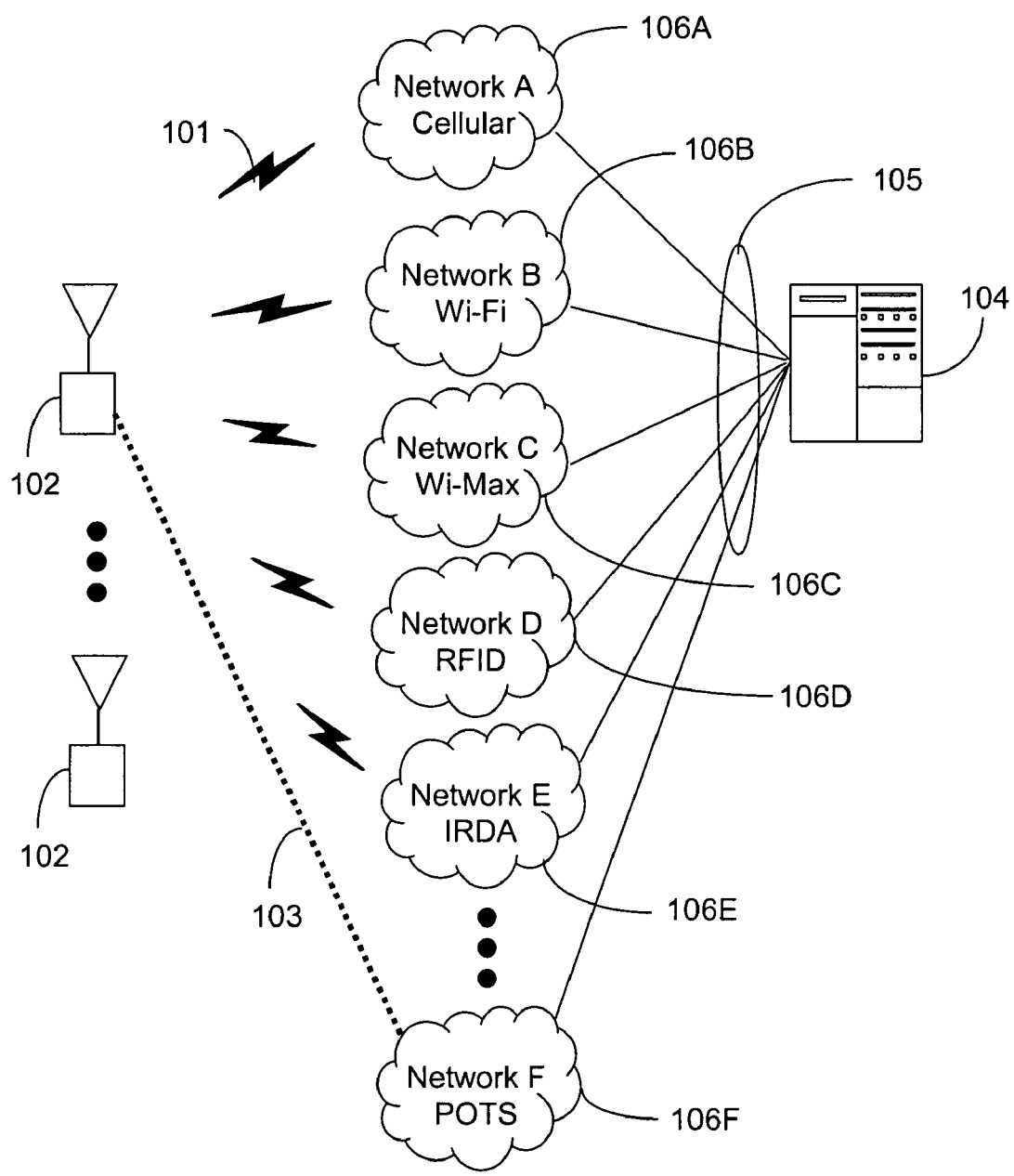
FIG. 1 is a block diagram of distinct communication networks coupled to a multimode communication device (MCD) and a location services controller (LSC) for locating the MCD according to teachings of the present disclosure.

FIG. 1 is a block diagram 100 of distinct communication networks 106 coupled to a multimode communication device (MCD) 102 and a location services controller (LSC) 104 for locating the MCD according to teachings of the present disclosure. Each of the communication networks 106A-F operates independently and utilizes a different technique for communicating with the MCD 102. For instance, Network 106A represents a cellular network utilizing any number of conventional protocols (e.g., GSM, CDMA, WCDMA, UMTS, TDMA, etc.). Network 106B utilizes conventional WiFi (Wireless Fidelity) communications (e.g, IEEE 802.11 a/b/g/ n). Network 106C has a more expansive wireless reach than network 106B with the use of conventional WiMax communications (such as IEEE 802.16e). Other communication network technologies such as RFID (Radio Frequency Identification), IRDA (Infrared Technology), and POTS (Plain Old Telephone Service) in a PSTN (Public Switched Telephone Network) can be used for communicating with the MCD 102. The MCD 102 can be embodied in a portable device (such as seen with cellular phones) with embedded conventional communication technologies capable of interfacing with two or more of the networks 106 of FIG. 1 with wireless 101 or wired 103 means.

It will be appreciated by those of ordinary skill in the art that the communication technologies shown in FIG. 1 are illustrative and not limiting to the present disclosure. Thus, any present or future communication technologies that can be used by an MCD 102 not mentioned herein is applicable to the present disclosure.

Figure 2:
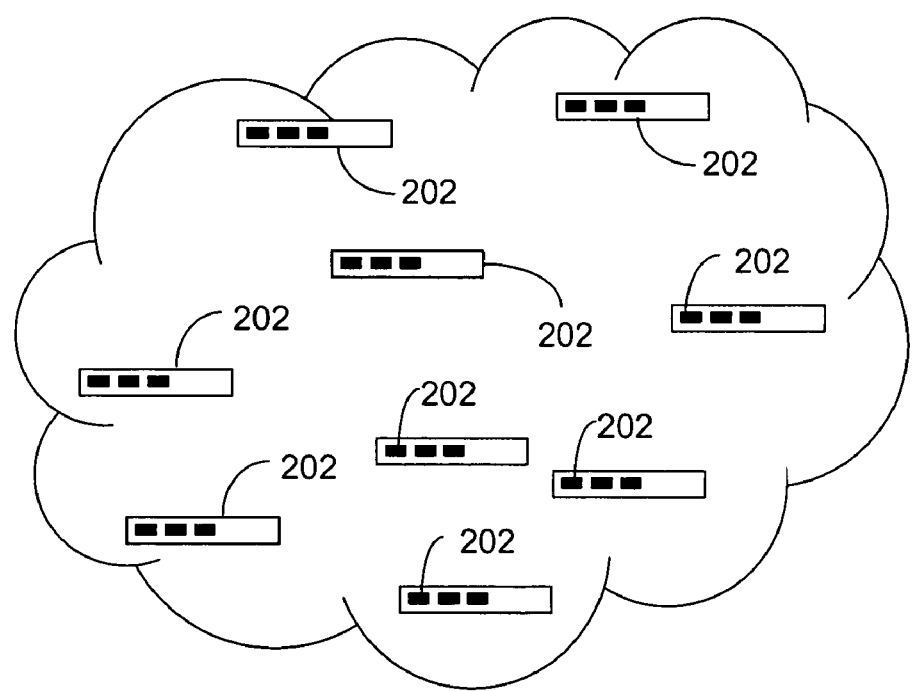
FIG. 2 is a block diagram of network elements commonly used by each of the communication networks of FIG. 1 according to teachings of the present disclosure.

FIG. 2 is a block diagram of network elements 202 commonly used by each of the communication networks 106 of FIG. 1 according to teachings of the present disclosure. A network element 202 can be any number of conventional communication devices for expanding the geographic coverage (or reach) of the communication network 106. In a cellular network a network element 202 can be represented by a conventional base station operating in a frequency reuse environment for communicating with a number of MCDs 102. In a WiFi network a network element can be represented by a wireless access point coupled to an IP (Internet Protocol) network, an MPLS (multi-protocol label switching) network, a FR/ATM (Frame Relay/Asynchronous Transfer Mode) network, or combinations thereof, for transporting data and/or voice messages such as VoIP (Voice over IP). Network elements 202 can be similarly used in the other communication networks 106 shown in FIG. 1. The location of each network element 202 is commonly recorded in a database of the service provider for maintenance and billing purposes.

The LSC 104 is coupled to the communication networks 106 for the purpose of locating an MCD 102. The service provider of the LSC 104 can be the same as the service provider for the networks 106 shown in FIG. 1. Alternatively, the service provider of the LSC 104 can be a third party service provider contracted by one or more of the service providers of networks 106. Under the present disclosure, any business arrangement is possible between service providers so long as the LSC 104 is given access to the networks 106, thereby enabling the LSC 104 to access information supplied by the MCDs 102 as well as relevant network information such as databases for locating network elements 202.

Figure 3:
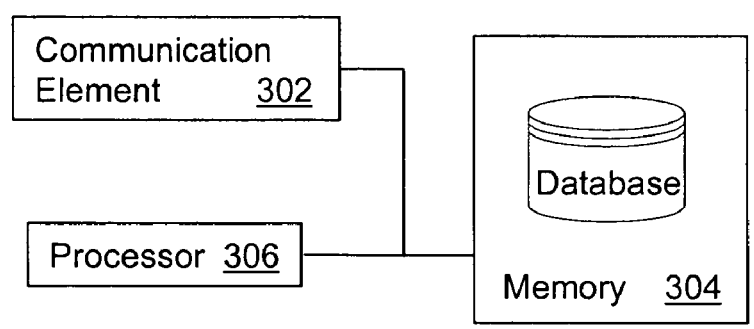
FIG. 3 is a block diagram of the LSC incorporating teachings of the present disclosure.
Figure 4:
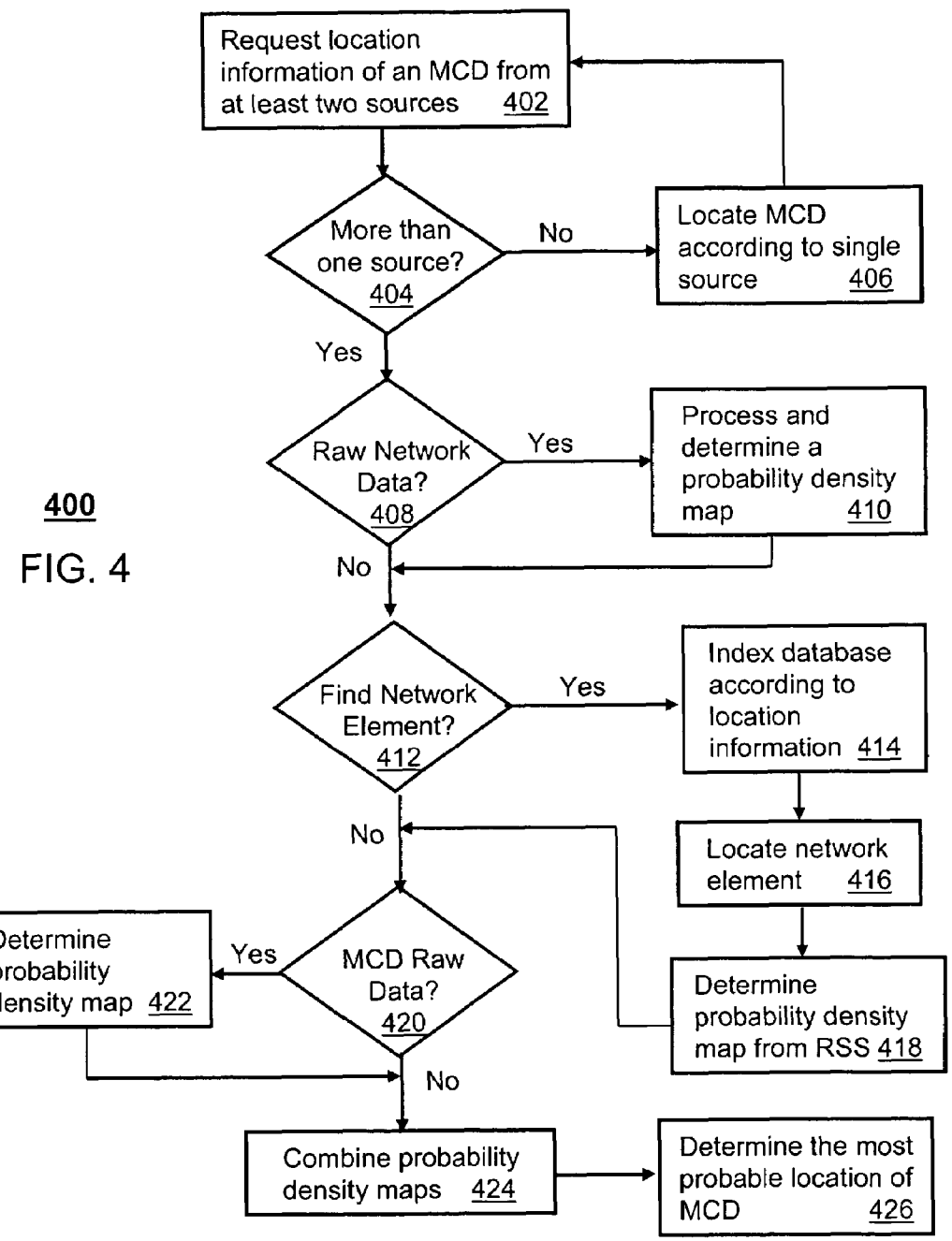
FIG. 4 depicts a flowchart of a method operating in the LSC incorporating teachings of the present disclosure.

As shown in FIG. 3, the LSC 104 comprises a communication element 302, a memory 304, and a processor 306. The communication element 302 utilizes conventional communication technology (such as an IP interface) for coupling to the communication networks 106 by wired and/or wireless means 105. The processor 306 can include one or more conventional computers or servers for performing the functions of the present disclosure. The memory 104 utilizes one or more conventional media devices (such as a high capacity disk drives, Flash memory, Dynamic Random Access Memory, Random Access Memory or other like memories) for storage purposes, and can be used for managing a database with conventional applications such as a CRM (Customer Relationship Management) system FIG. 4 depicts a flowchart of a method 400 operating in the LSC 104 incorporating teachings of the present disclosure. Method 400 begins with step 402 in which the LSC 104 is programmed to request location information of an MCD 102 from at least two sources selected among a group comprising the targeted MCD 102 and one or more communication networks 106 coupled to the MCD 102. Step 402 can be invoked by any number of independently operated sources. For example, the request can prompted by a user of the MCD 102, a Public Safety Answering Point (PSAB—i.e., E911 center), or commercial services operating in the LSC 104 which can be subcontracted by other parties. In step 402, the LSC 104 can receive location information from networks 106 in the form of conventional processed or raw triangulation data, or a location of a network element 202 communicating with the MCD 102. Location information can also be supplied by the MCD 102 in the form of a GPS (or assisted GPS—aGPS) reading (e.g., longitude and latitude coordinates), or a received signal strength (RSS) measurement corresponding to a radiated signal received by the MCD 102 from a network element 202 of one of the communication networks 106, and location information of said element 202.

In step 404, the LSC 104 checks whether more than one source of location information has been provided. If not, the LSC 104 proceeds to step 406 to locate by conventional means the MCD 102 according to a single source of location information and thereafter returns to step 402 for processing new requests. Otherwise, the LSC 104 proceeds to step 408 where it analyzes the sources of location information and determines whether any of the sources have provided raw data requiring further processing. If so, the LSC 104 proceeds to step 410 where it processes the raw data and determines a probability density map (PDM) therefrom. Raw network data can, for example, correspond to data use by any number of triangulation techniques such as TDOA, E-OTD, or Angle of Arrival.

Generally, location information supplied by, for example, a cellular network is an estimation of the locality of the MCD 102. To improve such estimates, a coverage area of the network 106 such as the area over which the triangulation is performed by a cellular system can be divided into small bins. Using conventional techniques, a probability density map can be determined by the LSC 104 to assess the probability that the MCD 102 is in a particular bin (see FIG. 5).

In a supplemental embodiment, the LSC 104 can in step 412 check whether the location information includes an RSS reading from the MCD 102 with location information relating to a network element 202 from which the RSS reading was made. In this case, the LSC 104 proceeds to step 414 where it indexes a database in its memory 304, or in the memory of an account management system of a network 106, which manages the identified network element 202. The location information supplied by the MCD 102 can include, for example, a network element identifier such as a basic service set identifier (BSSID) for identifying the network element 202 (e.g., a WiFi access point), and a communication network identifier such as an extended service set identifier (ESSID) for identifying the communication network 106 in which the network element 202 is operating in. From the foregoing database, a location of the network element 202 is determined in step 416, and in combination with the RSS reading, the LSC 104 in step 418 can calculate by conventional means a corresponding PDM and radial distance between the MCD 102 and network element 202 coupled thereto.

The LSC 104 can be further programmed to check in step 420 if the MCD 102 has provided raw location information without associated identification of a network element 202. In this embodiment, for example, the location information provided by the MCD 102 can consist of raw GPS information that needs to be processed in step 422 in order to derive longitudinal and latitudinal (lat-long) coordinates with an associated PDM.

In steps 424 and 426 the PDMs of each source of location information are then combined to determine in the aggregate the most probable location coordinate of the MCD 102. These steps can best be described by way of example.

Assume a PDM obtained from a first network (say a GSM cellular network) is given by the following equation:

$$Pr\{\vec{r}_{ij}|A\} = f_1(\vec{r}_{ij}) \qquad (1)$$

where A is the set of measurements based on which the triangulation has been performed, and $\vec{r}_{ij}$ is the location of the bin from the $i^{th}$ row and $j^{th}$ column.

Also, assume a PDM obtained from a second network (say a WiFi network) is given by:

$$Pr\{\vec{r}_{ij}|B\} = f_2(\vec{r}_{ij}) \qquad (2)$$

where B is the set of measurements based on an RSS reading and a location of an associated network element 202. If a particular set of measurements in either of the two networks is corrupted by noise, it is reflected in the shape and variation of the PDM across a grid of bins (see FIG. 5). A flat PDM with almost all bins equally likely indicates unreliable measurements were used in calculating the PDM and vice-versa. Based on the PDMs a calculation is made on the combined PDM according to the set of measurements A and B from the two networks.

$$Pr\{\vec{r}_{ij}|A \cap B\} \qquad (3)$$

Before proceeding with a soft combination of the PDMs it is important to obtain a-priori probabilities of the two PDMs. This can be obtained as follows:

$$\frac{Pr\{A|\vec{r}_{ij}\}Pr\{\vec{r}_{ij}\}}{\sum_{i',j'} Pr\{A|\vec{r}_{i',j'}\}Pr\{\vec{r}_{i',j'}\}} = Pr\{\vec{r}_{ij}|A\} \qquad (4)$$

If it is assumed that the a-priori probability of the MCD 102 is equally likely in all the bins, i.e., $Pr\{\vec{r}_{i',j'}\} = Pr\{\vec{r}_{i,j}\}$, then equation (4) can be expressed as:

$$Pr\{A|\vec{r}_{i,j}\} = P\{\vec{r}_{i,j}|A\} \sum_{i',j'} Pr\{A|\vec{r}_{i',j'}\} = N_1 f_1(\vec{r}_{i,j}) \qquad (5)$$

where the constant $N_1$ is not yet known at this point.

A similar exercise for a PDM from the second network provides another a-priori probability map:

$$Pr\{B|\vec{r}_{i,j}\} = P\{\vec{r}_{i,j}|B\} \sum_{i',j'} Pr\{B|\vec{r}_{i',j'}\} = N_2 f_2(\vec{r}_{i,j}) \qquad (6)$$

The joint a-priori probability can be related to these probabilities as follows:

$$Pr\{A \cap B | \vec{r}_{ij}\} = \frac{\{A \cap B \cap \vec{r}_{ij}\}}{Pr\{\vec{r}_{ij}\}} \quad (7)$$

$$= \frac{\cancel{Pr\{\vec{r}_{ij}\}}Pr\{B|\vec{r}_{ij}\}Pr\{A|B \cap \vec{r}_{ij}\}}{\cancel{Pr\{\vec{r}_{ij}\}}}$$

Since the measurements A and B are made on two separate networks 106 with distinct radio conditions it is not unreasonable to assume that A does not depend explicitly on B. However, both A and B will be correlated due to their implicit correlation with $\vec{r}_{ij}$. Under this assumption equation (7) can be simplified as:

$$Pr\{A \cap B | \vec{r}_{ij}\} = Pr\{B|\vec{r}_{ij}\}Pr\{A|\vec{r}_{ij}\} = N_1 N_2 f_1(\vec{r}_{ij})f_2(\vec{r}_{ij}) \quad (8)$$

Using equation (8) and the relationship between a-priori and posteriori probabilities as shown in equation (4) a combined PDM can be obtained according to the following equation:

$$Pr\{\vec{r}_{ij}|A \cap B\} = \frac{f_1(\vec{r}_{ij})f_2(\vec{r}_{ij})}{\sum_{i',j'} f_1(\vec{r}_{i'j'})f_2(\vec{r}_{i'j'})} \quad (9)$$

Figure 5:
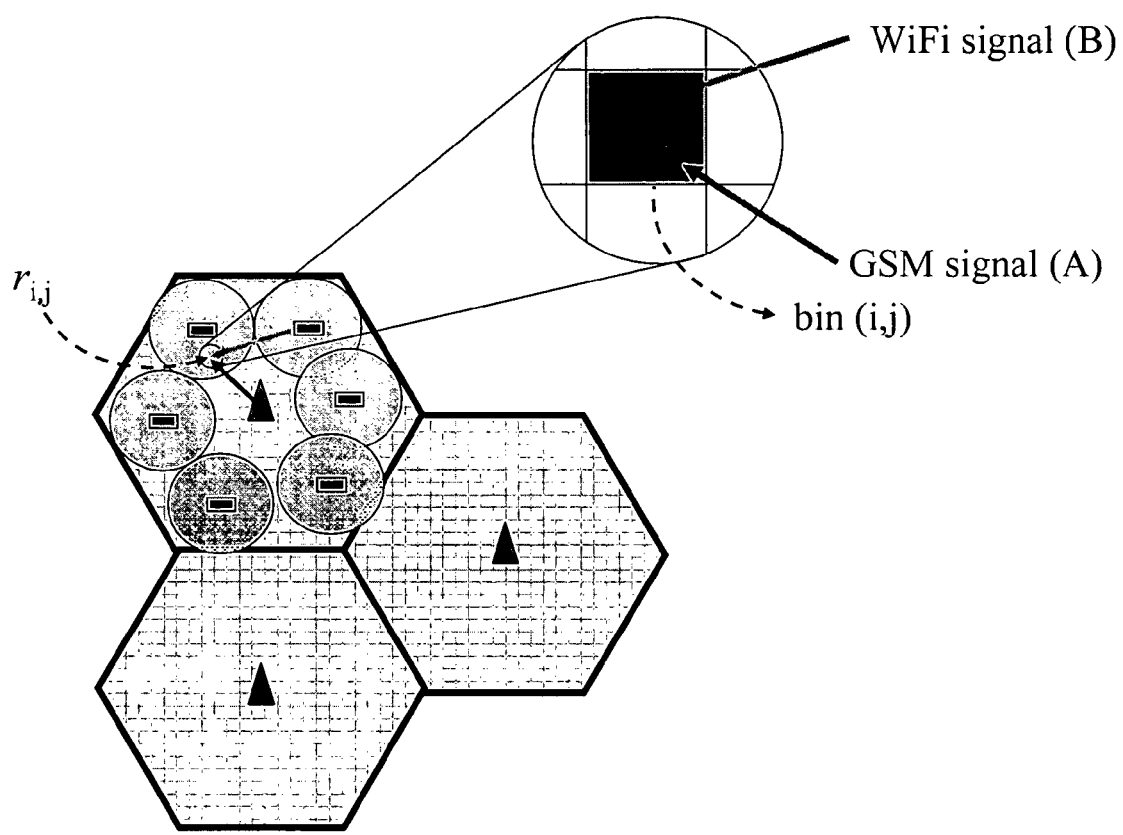
FIG. 5 depicts bins of a probability density map (PDMY for locating the MCD according to teachings of the present disclosure.

Since the reliability of each PDM (which indicates how accurate or inaccurate a given PDM is in terms of obtaining an estimate) is built into the probability information, it is automatically transferred to the combined PDM. According to this approach a more reliable (sharper) PDM is weighted more than a less reliable (flatter) PDM. The combined PDM can therefore provide a more accurate location reading of the MCD 102 as shown in FIG. 5. The present disclosure also provides for determining a most probable location of the MCD from a PDM supplied by each of the sources of location information.

Although only two sources of location information have been demonstrated in the foregoing illustration, it would be apparent to those of ordinary skill in the art that the above analysis can be extended to more sources of location information. It would also be apparent to said artisan that any alternative present or future statistical technique not described herein can be applied by the LSC 104 in determining a location of the MCD 102. It should also be evident to said artisan that although wire line systems, infrared systems, and RFID (Radio Frequency ID) networks were not discussed, such systems can be applied to method 400 as presented herein.

It should further be evident to said artisan that the functions presented in FIG. 4 can be centralize, decentralized, and/or integrated in whole or in part with the communication networks 106 of FIG. 1. Moreover, said functions can be incorporated into any industry standard such as, for example, the IP Multimedia System (commonly known as IMS)—a 3GPP (3rd Generation Partnership Project) and 3GPP2 effort that defines an all IP based wireless network. It should also be apparent that the present disclosure differs from assisted GPS in that in an aGPS application a location server coupled thereto relies on a single source of location information (i.e., the mobile device that provides an aGPS reading) rather two or more independent sources of location information such as, for example, a first location reading consisting of identifiers of a network element 202 and an associated RSS reading from the MCD 102, a second location reading from the MCD 102 consisting of an aGPS measurement, and/or a third location reading from an RFID network coupled to the MCD 102, and so on.

Figure 6:
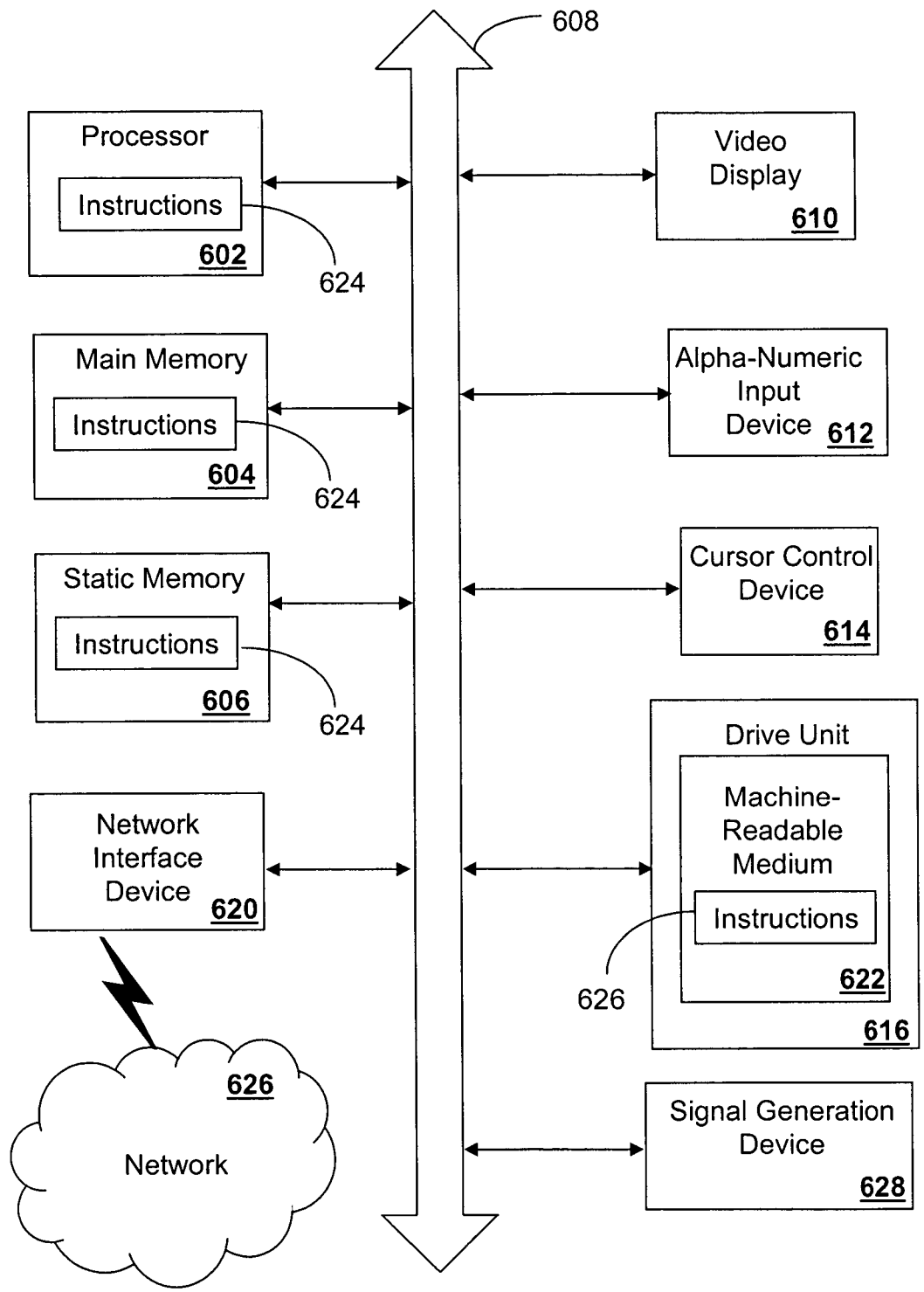
FIG. 6 is a diagrammatic representation of a machine in the form of a computer system within which a set of instructions, when executed, may cause the machine to perform any one or more of the methodologies discussed herein

FIG. 6 is a diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored. The exemplary embodiments can include a computer-readable storage medium, comprising computer instructions for performing steps described herein.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A location services controller (LSC) for locating multi-mode communication devices (MCDs), comprising:
   a communication element for communicating with a plurality of communication networks having at least a network element and MCDs coupled thereto;
   a memory; and
   a processor for controlling operations of the communication element, and the memory that is programmed to:
   receive a request for a location of an MCD;
   retrieve location information associated with the MCD from at least two independent sources in response to the request; the independent sources being selected among a group comprising the MCD and one or more communication networks coupled to the MCD;
   determine from the location information supplied by said sources the location of the MCD;
   receive location information corresponding to a network element of the communication networks coupled to the MCD;
   search for the network element according to the location information;
   locate the network element;
   receive a received signal strength (RSS) measurement supplied by the MCD corresponding to a signal intercepted by the MCD from said network element;
   process the RSS measurement;
   determine a probability density map for each source of location information, wherein the probability of the density map is determined from the processed RSS measurement and the location of the network element; and
   determine a most probable location of the MCD from a combination of the probability density maps.

2. The LSC of claim 1, wherein the processor is programmed to determine from the sources of location information a most probable location of the MCD.

3. The LSC of claim 1, wherein the processor is programmed to determine a most probable location of the MCD from a combination of a probable location supplied by each of the sources of location information.

4. The LSC of claim 1, wherein the processor is programmed to locate one or more network elements of the communication networks coupled to the MCD according to the location information supplied.

5. The LSC of claim 4, wherein the processor is programmed to:
   index the memory according to the location information; and
   locate one or more network elements of the communication networks according to said location information.

6. The LSC of claim 1, wherein the processor is programmed to:
   detect one or more sources of location information requiring further processing;
   process said one or more sources of the location information; and
   determine from the processed information one or more probable locations of the MCD.

7. The LSC of claim 6, wherein at least one of the sources of location information comprises a triangulation reading from a network element of the communication networks, a GPS (Global Positioning System) reading, and a received signal strength (RSS) measurement supplied by the MCD corresponding to a signal received by the MCD from a network element of one of the communication networks and location information relating to said network element, and wherein the processor is programmed to process and determine a probable location of the MCD according to said information.

8. The LSC of claim 1, wherein the communication networks are among a group of communication networks comprising a wire line communication network, a cellular communication network, a WiFi communication network, a WiMax communication network, an RFID communication network, and an infra-red communication network, and wherein said communication networks comprise network elements, wherein a location for each of said network elements is stored in the memory.

9. A computer-readable storage medium, comprising computer instructions for:
   retrieving location information of a multimode communication device (MCD) from at least two sources selected among a group comprising the MCD and one or more communication networks coupled to the MCD;
   receiving location information corresponding to a network element of the communication networks coupled to the MCD;
   searching for the network element according to the location information;
   locating the network element;
   receiving a received signal strength (RSS) measurement supplied by the MCD corresponding to a signal intercepted by the MCD from said network element;
   processing the RSS measurement;
   determining a probability density map from the processed RSS measurement and the location of the network element; and
   determining a probable location of the MCD from probability density maps supplied by the sources of location information.

10. The storage medium of claim 9, comprising computer instructions for:
    processing one or more other sources of location information using at least one among a triangulation reading from a network element of the communication networks, a GPS (Global Positioning System) reading, and a received signal strength (RSS) measurement supplied by the MCD corresponding to a signal received by the MCD from a network element of one of the communication networks and location information relating to said network element; and
    determining the probable location of the MCD based in part on said processed information.

11. The storage medium of claim 10, comprising computer instructions for receiving a request for a location of an MCD and retrieving the location information in response to the request.

12. The storage medium of claim 10, comprising computer instructions for determining a most probable location of the MCD from the probability density maps supplied by each of the sources of location information and the processed information.

13. The storage medium of claim 9, comprising computer instructions for:
    receiving a network element identifier and a communication network identifier corresponding to the network element and communication network coupled to the MCD; and
    searching for the network element according to said identifiers.

14. The storage medium of claim 9, comprising computer instructions for:
    detecting one or more sources of location information requiring further processing;
    processing said one or more sources of the location information; and
    determining from the processed information one or more probability density maps of the MCD.

15. A method, comprising the steps of:
    requesting location information of a multimode communication device (MCD) from at least two sources selected among a group comprising the MCD and one or more communication networks coupled to the MCD;
    receiving location information corresponding to a network element of the communication networks coupled to the MCD;
    searching for the network element according to the location information;
    locating the network element;
    receiving a received signal strength (RSS) measurement supplied by the MCD corresponding to a signal intercepted by the MCD from said network element;
    processing the RSS measurement; and
    determining from the location information supplied by said sources probability density maps for each source, wherein the probability density mans are determined from the processed RSS measurement and the location of the network element; and
    determining from the probability density maps a most probable location of the MCD.

16. The method of claim 15, comprising the step of determining the most probable location of the MCD from a combination of the probability density maps.

17. The method of claim 15, comprising the steps of:
    determining a probable radial distance between network element and the MCD; and
    determining the probability density map according to said probable radial distance.

18. The method of claim 15, comprising the steps of:
    receiving a request for a location of the MCD; and requesting the location information in response to the request for the location of the MCD.

* * * * *